Dec. 7, 1948.    R. J. VAN STONE    2,455,629
FENDER BRACE
Filed Aug. 6, 1947

INVENTOR.
R. J. Van Stone
BY Robert Robb
Attorney

Patented Dec. 7, 1948

2,455,629

UNITED STATES PATENT OFFICE 2,455,629

FENDER BRACE

Robert J. Van Stone, Rocky River, Ohio

Application August 6, 1947, Serial No. 766,761

3 Claims. (Cl. 280—154)

1

The object of my present invention has been to produce a novel form of brace of the type commonly utilized for bracing the fenders of automobiles.

In the carrying out of my invention I have designed a brace structure which comprises complemental and cooperating adjustable parts or sections, the said sections having a substantially telescoping arrangement whereby the length of the brace may be varied or adjusted by relative sliding movement of the sections. Another feature of my novel construction lies in the provision of brace sections which are so formed that relative rotation of the sections when fitted together and when adjusted to proper positions preliminary to final fixing of the same in mounted condition on a vehicle, is prevented.

Still another feature of improvement of my novel brace means resides in the formation of the brace sections of polysided form, preferably triangular form, in cross section for the purpose of effectuating the object previously mentioned of preventing the relative rotation of the brace parts, and for the further object of enabling the edge portions of each brace section to be exposed longitudinally of the brace unit, and side by side, whereby after the brace is adjusted to its position bracing the fender of the vehicle and extending between the fender and a frame part of the vehicle, the said exposed longitudinal edge portions of the brace sections may be spot welded at intervals in order to fix the sections at their final adjustment for performing their bracing function.

With the aforegoing and other objects in mind, a full understanding of my invention and the merits of the construction proposed thereby, will be had upon reference to the following detailed description, and to the accompanying drawings, in the latter of which—

Figure 4:
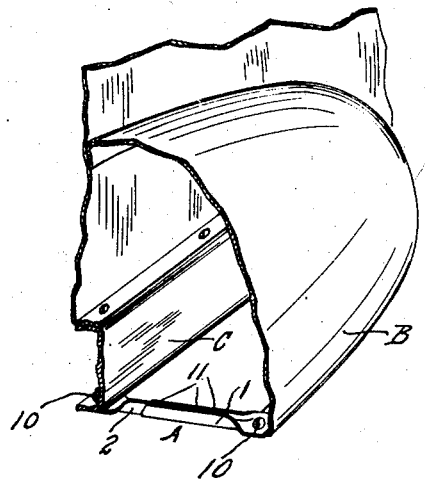

Figure 4 is a fragmentary view showing frame portions of an automotive vehicle and a portion of the fender connected therewith, illustrating one manner of attaching my brace between such parts for effective bracing action, the view also illustrating the brace means in its final condition with the exposed edge portions of the brace sections welded together by spot weld at intervals in the length thereof.

Specifically describing the form of my invention shown in the drawing annexed hereto my brace as a whole is designated A and may be characterized as an outer brace section 1 and an inner brace section 2, end portions of these sections fitting into one another in a telescopic manner so that relative sliding of the sections of the brace may be produced for obtaining the necessary adjustment of the parts preliminary to fixing them at such adjustment by final attachment together.

The end of each section 1 and 2 opposite the telescoping end portion previously mentioned is flat as shown at 3 for the section 1 and 4 for the section 2.

Each brace section is formed from a flat piece of sheet metal suitably long for the purpose, the edges of the metal of each such piece being rolled in a manner from the flat portion into the telescoping end portion previously referred to.

For preventing the relative turning of the telescoping end portions of the brace sections 1 and 2, I form each of the telescoping end members into a hollow somewhat triangular shape (see Figure 3) the shapes providing sloping sides and a cross connecting portion designated 5 for the member 1 and the similar cross connecting portion 6 for the member 2 that slides within the member 1. The sloping side portions of the member 1 are slightly spaced apart at the free edges thereof so that the interfitting free edges of the sides of the member 2 are exposed as shown at 7 and located intermediate the free edges 8 of the member 1.

By the foregoing construction of the sections of my brace the several edges shown at 7 and 8 are sufficiently exposed as to permit the forming of weld spots at intervals in the length of the said edges where the parts 1 and 2 telescope together.

Figure 1:
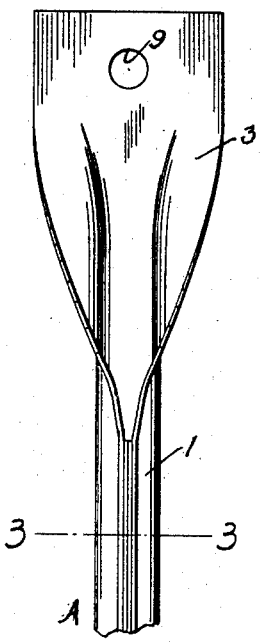
Figure 1 is a simple plan view of a fender brace of the improved form of my present invention, the condition of the parts or sections being that previous to the final welding together of the same.
Figure 2:
Figure 2 is a side elevation view illustrating the parts as shown in Figure 1.
Figure 3:
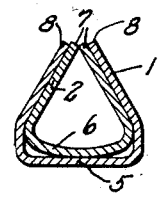
Figure 3 is a transverse sectional view taken about on the line 3—3 of Figure 1.

Not only is the construction of my brace very simple, but its mode of application to an automotive vehicle or any place where braced parts of a similar nature are desired to be used, is likewise simple. In Figure 4 I illustrate only one method of application of the brace to an automotive vehicle. The flat ends of the sections 1 and 2 designated 3 and 4 respectively are formed with openings 9 through which a screw bolt or rivet may be passed. As shown in Figure 4 the brace means of my invention is applied in a somewhat horizontal manner to connect the outer portion of a fender B such as used in modern automobiles to the chassis or frame C of a car. To the above end the sections of the brace are fitted together telescopically as seen in Figures 1 and 2 and 3 and then applied to the parts B and C by means of any suitable attachment members such as rivets or bolts 10. Thereupon the parts B and C are adjusted to their proper positions, this action at the same time of course adjusting the relative positions of the sections 1 and 2 of the brace and when the proper adjustment has been secured the exposed edge portions 7 and 8 of the telescoping ends of the brace members 1 and 2 are spot welded at intervals as shown at 11 in Figure 4. With the brace finally applied to a car or any similar place of use in the manner specified the sections thereof are held rigidly together, there is no possibility of relative rotation of these sections under stress that might tend to break any spot weld joints that would be produced, and the spot welds are capable of absolutely fixing the relation of the brace parts and the parts with which they are connected, in an obvious manner.

A brace made in accordance with my invention can be very simply struck out and formed from sheet metal, is cheap to manufacture and can be installed in a very short space of time with great ease. In its application as shown in Figure 4 the fender B would of course be moved inward or outward for perfect alignment as required, prior to the spot welding of the raw edges 7 and 8 of the brace parts 1 and 2.

Having thus described my invention, what I claim as new and desire to secure by Letters Patent of the United States is:

1. As a new article of manufacture, an adjustable brace comprising complemental sections each having an attaching portion at its outer end, each section being made of a strip of sheet metal having a body portion, from a point adjacent said attaching portion to a point adjacent the other end thereof, bent into a hollow shape with the side edge portions of the metal strip exposed, the hollow portion of one section fitting into that of the other section for relative sliding to adjusted positions to determine the length of the brace with the said exposed edge portions of each section disposed side by side, and weld means applied at said edge portions to rigidly unite the sections together in predetermined positions.

2. A brace as claimed in claim 1, in which the hollow portions of the brace sections are flat at the bottom with the sides inclining upwardly and inwardly toward each other to afford an approximately triangular cross section with the said exposed edges uppermost and in approximately the same horizontal plane.

3. As a new article of manufacture, an adjustable brace comprising complemental telescoping sections each having an attaching portion at its outer end, the first section being made of a strip of sheet metal having a body portion from a point adjacent said attaching portion to a point adjacent the other end thereof bent into a hollow shape with the side edge portions of the metal strip in longitudinally adjacent exposed relation, the other section having a body portion from a point adjacent its attaching portion to a point adjacent the other end thereof shaped to fit telescopically into the hollow shaped body portion of the first section for relative sliding of the sections to adjusted positions to determine the length of the brace, the side edge portions of the first section being separated from one another to expose the body portion of the other section, longitudinally of the brace intermediate the exposed edge portions of the first section for enabling fastening together of the exposed edge portions of the first section and the exposed body portion of the other section.

ROBERT J. VAN STONE.

REFERENCES CITED

The following references are of record in the file of this patent:

UNITED STATES PATENTS

| Number | Name | Date |
|---|---|---|
| 653,000 | Dundon | July 3, 1900 |
| 1,154,955 | Wills | Sept. 28, 1915 |
| 1,535,826 | Graham | Apr. 28, 1925 |
| 1,578,473 | Schimanski | Mar. 30, 1926 |
| 1,711,725 | Edwards et al. | May 7, 1929 |
| 1,812,756 | Riggs | June 30, 1931 |
| 2,252,012 | Le Tourneau | Aug. 12, 1941 |